SIZE STABILIZATION

Filed May 14, 1965 2 Sheets-Sheet 1

INVENTORS
TODD J. CHRISTOPHER &
JAMES A. McDONALD
BY William H. Meagher
Attorney INVENTORS
TODD J. CHRISTOPHER &
JAMES A. McDONALD
BY William H. Meagher
Attorney United States Patent Office 3,388,285
Patented June 11, 1968

3,388,285

SIZE STABILIZATION

Todd J. Christopher, Canton, Ohio, and James A. McDonald, Indianapolis, Ind., assignors to Radio Corporation of America, a corporation of Delaware Filed May 14, 1965, Ser. No. 455,748
3 Claims. (Cl. 315—19)

ABSTRACT OF THE DISCLOSURE

A transistor vertical deflection circuit having a plural stage emitter follower amplifier. A negative feedback path includes a capacitor for developing a sawtooth voltage and a variable height controlling resistor. Variation in the capacitor charging current, with resultant raster size change, due to variations in the line voltage supply are compensated for by a voltage dependent resistor regulating the voltage across the variable height controlling resistor.

The present invention relates to transistor deflection circuits, and particularly to apparatus for stabilizing the size of the scanning raster produced by such deflection circuits.

In a copending application of John B. Beck and Roland N. Rhodes, entitled, "Transistor Deflection Circuits," and concurrently filed herewith, transistor deflection circuits of a type utilizing the principles of the so-called "Miller Integrator," and particularly suitable for service as vertical deflection circuits in a television receiver, are disclosed. In the operation of such circuits, a sawtooth voltage is developed across a capacitor incorporated in a negative feedback path looped around a high gain amplifier. In the development of the trace portion of the desired sawtooth, an external resistance path shunting the amplifier input provides the main capacitor charging current path, and the amplitude of the current therethrough accordingly is determinative of the sawtooth slope, and hence the picture height. As noted in the Beck and Rhodes application, said external resistance path may desirably comprise a variable resistor, providing a facility for manual height control.

In television receiver use of such deflection circuits, a problem may be encountered due to variations in the line voltage used in operating the receiver. Unless correction is provided, changes in the line voltage will be reflected in changes in the capacitor charging current of the above-described deflection circuit, resulting in an annoying raster size change on the screen of the receiver's picture tube. The present invention is directed to circuitry for precluding such annoying raster size changes.

In accordance with an embodiment of the present invention, the desired size stabilization is achieved through a form of regulation of the voltage across the aforementioned height controlling resistance. Particular circuitry is provided for this purpose involving reliance on the relatively constant voltage characteristics of a voltage dependent resistor (VDR). By suitable arrangement of the voltage dependent resistor in a voltage divider across the receiver's B+ supply, and return of the height controlling resistor to a proper point on this voltage divider, the vertical raster size may be rendered substantially insensitive to line voltage changes. In accordance with a further feature of the present invention, the apparatus used for such size stabilization purposes may further be utilized to aid in stabilization of the biasing of a transistor serving to switch the aforementioned feedback capacitor between charging and discharging conditions.

A primary object of the present invention is to provide a novel and improved transistor deflection circuit.

A further object of the present invention is to stabilize operating parameters of a transistor deflection circuit, precluding undesired changes therein due to line voltage variations.

Other objects and advantages of the present invention will be readily recognized by those skilled in the art after a reading of the following detailed description and an inspection of the accompanying drawings in which.

Figure 1:
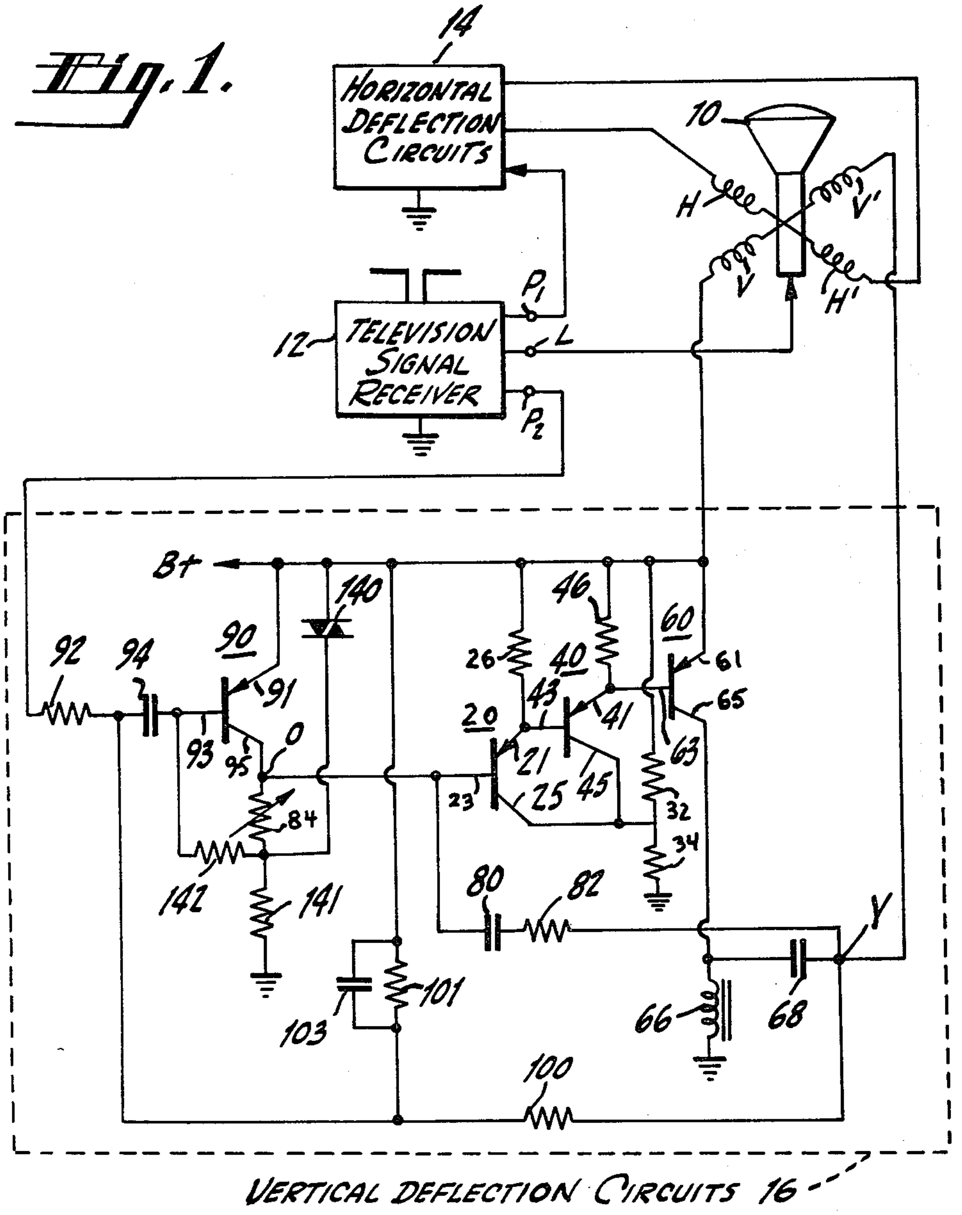
FIGURE 1 illustrates in block and schematic form, a television receiver incorporating a vertical deflection circuit embodying the principles of the present invention.

In FIGURE 1, the bulk of the circuits of a television receiver, serving to provide signals for energizing a picture tube 10, are represented by a single block 12, labelled "television signal receiver." The receiver unit 12 may incorporate the usual elements requisite to provide video signals (at output terminal L) for appropriate intensity modulation of the picture tube's electron beam, as well as to provide suitable synchronizing pulse information (at output terminals $P_1$ and $P_2$) to synchronize, in respective horizontal and vertical deflection circuits 14 and 16, the energization of the respective windings (H, H' and V, V') of the picture tube's deflection yoke.

In the vertical deflection arrangement of FIGURE 1, a sawtooth current waveform is caused to pass through the vertical deflection windings V and V' of the deflection yoke, the windings V and V' being connected in series between the receiver's source of unidirectional potential (B+) and the yoke input terminal Y. The flow of the desired sawtooth current waveform in the windings, which appear essentially resistive, is in response to the development of a sawtooth voltage waveform at terminal Y. The development of this sawtooth voltage waveform is effected through use of a transistorized arrangement employing the principles of the "Miller Integrator."

Transistors 20, 40 and 60 are cascaded to form a high current gain amplifier. Negative feedback is established between the amplifier output and the amplifier input via a path incorporating a capacitor 80. Capacitor 80 is subject to alternate charging and discharging, per switching action of transistor 90. The amplifier output voltage waveform (at terminal Y) is a substantially linear sawtooth voltage waveform per "Miller Integrator" principles.

When transistor 90 is conducting, it shorts the feedback amplifier input terminal O (at the base of transistor 20) to the B+ potential source; when transistor 90 is nonconducting, terminal O sees the transistor 90 stage as an open circuit. Switching of transistor 90 betwen these two states occurs on a recurrent, oscillatory basis, transistor 90 cooperating with the output transistor 60 in the fashion of an astable multivibrator.

Multivibrator action is sustained by the coupling of the output electrode (collector 95) of transistor 90 to the input electrode (base 63) of transistor 60 via transistors 20 and 40, and the coupling of the output electrode (collector 65) of transistor 60 to the input electrode (base 93) of transistor 90 via a feedback resistor 100. Synchronization of the multivibrator action is effected through the application of synchronizing pulses from terminal $P_2$ to base 93 via a resistor 92 in series with a capacitor 94. The feedback resistor 100 is connected between the yoke input terminal Y and the junction of resistor 92 and capacitor 94. A parallel RC network comprising resistor 101, shunted by capacitor 103, is coupled between the aforesaid junction and the B+ source, and serves a pulse shaping function, partially integrating the vertical flyback pulses fed back from terminal Y, and discriminating against the undesired feedback of horizontal frequency pulses, which may undesirably be induced in the vertical yoke windings via coupling from the horizontal yoke windings.

Transistor 20 is arranged in an emitter follower configuration, its emitter electrode 21 being connected via an emitter resistor 26 to the receiver's B+ terminal. Transistor 40 provides a second emitter follower stage, appearing as an emitter load of the transistor 20 emitter follower, the base electrode 43 of transistor 40 being directly connected to emitter electrode 21, and the emitter electrode 41 of transistor 40 being connected via an emitter resistor 46 to the B+ terminal. The collector electrodes 25 and 45 of the two emitter follower stages are jointly connected to an appropriate division point on a low impedance voltage divider connected between B+ and chassis ground; the voltage divider comprises the series combination of resistors 32 and 34, with the collector electrodes connected to the junction of the series resistors.

The output of the cascaded emitter follower stages is applied to the base electrode 63 of output transistor 60, base 63 being directly connected to emitter 41. The emitter 61 of transistor 60 is connected to the B+ terminal. A direct current conductive path between the collector electrode 65 of transistor 60 and chassis ground is provided through a choke 66 (of high AC impedance). An alternating current signal path is also provided between the collector 65 and the emitter 61, this path comprising a DC blocking capacitor 68 in series with the vertical yoke windings V, V'. The aforementioned yoke input terminal Y appears at the junction of blocking capacitor 68 and the yoke winding V'.

Feedback between terminal Y and the base input of transistor 20 is provided via a path comprising resistor 82 in series with the capacitor 80. A variable resistor 84 (in series with a fixed resistor 141, serving a function to be subsequently described) connects the base 23 to chassis ground. The nature of the feedback provided via capacitor 80 is negative, since the emitter follower stages 20 and 40 produce no signal phase reversal, whereby only a single phase reversal (i.e., that contributed by stage 60) is provided within the feedback loop.

To appreciate the mode of operation of the apparatus heretofore recited, it may be convenient to first consider the operation assuming the omission of emitter follower stages 20 and 40, i.e., whereby terminal O would be directly connected to the base 63 of output transistor. When transistor 90 is nonconducting, transistor 60 is biased for conduction and a charging circuit for capacitor 80 is established between B+ and chassis ground, the circuit comprising the series combination of the conducting output transistor 60, blocking condenser 68, capacitor 80, resistor 82, variable resistor 84, and resistor 141. Assuming resistor 84 to be large in resistance value relative to the resistance values of resistors 82 and 141, resistor 84 will be primarily determinative of the charging rate (and may, accordingly, conveniently serve as a manual height control). The negative feedback action tends to oppose changes in the potential at terminal O during the charging period, whereby the voltage across resistor 84 varies but slightly; the current therethrough is accordingly relatively constant. A capacitor charging current of such relatively constant character assures a high degree of linearity of the resultant sawtooth voltage. The charging time constant is effectively considerably larger than that suggested by the physical values of capacitor 80 and resistor 84 due to the dynamic action of the amplifier which multiplies the effective capacitance by a factor dependent upon the amplifier gain.

When transistor 90 is conducting, transistor 60 is driven to cut-off, and a discharging circuit for capacitor 80 is completed comprising, in series, the conducting transistor 90, capacitor 80, resistor 82 and the yoke windings V, V'. Resistor 82 is primarily determinative of the discharging rate (and may be made variable for service as a manual linearity control, if desired); with resistor 82 appropriately smaller than resistor 84, per the previous assumption, the discharging time constant is much shorter than the charging time constant.

From the foregoing simplified description, it can be seen that the effect of the periodic switching of transistor 90 between conducting and nonconducting states is to develop across capacitor 80 (i.e., at terminal Y with respect to chassis ground) a substantially linear sawtooth voltage waveform, resulting in the desired sawtooth current waveform flowing through the effectively resistive yoke windings V, V'.

However, it should be appreciated that for the above described type of operation to take place, it is essential that the transistor amplifier present a very high input impedance to terminal O. As a practical matter, while special transistors such as those of the so-called MOS type may inherently present high input impedances, the conventional transistor is a relatively low input impedance device. Thus, if transistor 60 were a conventional transistor and were relied upon as the sole amplifying device within the feedback loop, its relatively low input impedance would deteriorate the capacitor charging action desired. However, by interposing the transistor emitter follower stages between terminal O and the base input of transistor 60, this problem is solved. That is, terminal O now sees a very high input impedance; i.e., the input impedance of an emitter follower, incorporating in its emitter load a further emitter follower, which in turn incorporates in its emitter load the input impedance of transistor 60. The net input impedance presented by this combination is sufficiently large to permit the desired charging action.

The emitter follower stages also serve to contribute current gain within the negative feedback loop, whereby a high current gain amplifier is realized. The capacitance multiplying effect of the arrangement is thereby enhanced. Through reliance on this capacitance multiplying effect, problems of instability and/or expense associated with the use of large-valued-electrolytic capacitors as the sawtooth capacitor may be avoided. The effect of a large valued capacitor may be obtained, though the actual capacitor used as capacitor 80 may be a relatively small, stable and inexpensive capacitor of the paper type (of a .1 microfarad value, for example).

In the usual television receiver, changes in line voltage will be reflected to some degree in the magnitude of the B+ potential developed by the receiver's low voltage supply circuits. Unless otherwise corrected, the amplitude of the sawtooth developed through capacitor charging action in the abovedescribed series circuit will reflect such B+ variations. However, pursuant to the principles of the present invention, such sawtooth variations are substantially precluded through the use of a voltage dependent resistor 140, which is connected between the B+ supply point and the junction of height control resistor 84 and resistor 141. The inherent characteristics of the voltage dependent resistor 140 are such as to tend to maintain, within limits, a substantially constant voltage across its terminals, whereby the voltage across the series combination of resistor 84, resistor 82, capacitor 80 and the yoke windings V, V' remains substantially constant despite fluctuations in the B+ supply potential. The capacitor charging current is thereby rendered substantially independent of the B+ variations, whereby the desired vertical size stabilization is achieved.

Since VDR 140 and resistor 141 form a voltage divider between B+ and ground, the effect of maintaining a substantially constant voltage drop across the VDR 140 segment of the divider is to repeat the B+ fluctuations, without significant attenuation, across the resistor 141. Advantage is taken of this fact to stabilize the effective operating point of transistor 90. A DC return for the base 93 of transistor 90 is provided via the connection of resistor 142 between the base 93 and the junction of VDR 140 and resistor 141. By this arrangement, the bias on the base 93 moves up and down with fluctuations in B+ potential in substantially the same degree as the emitter 91 (which is returned directly to B+). As a consequence, the potential difference between base 93 and emitter 91 is free of the effects of the undesired B+ fluctuations.

Figure 2:
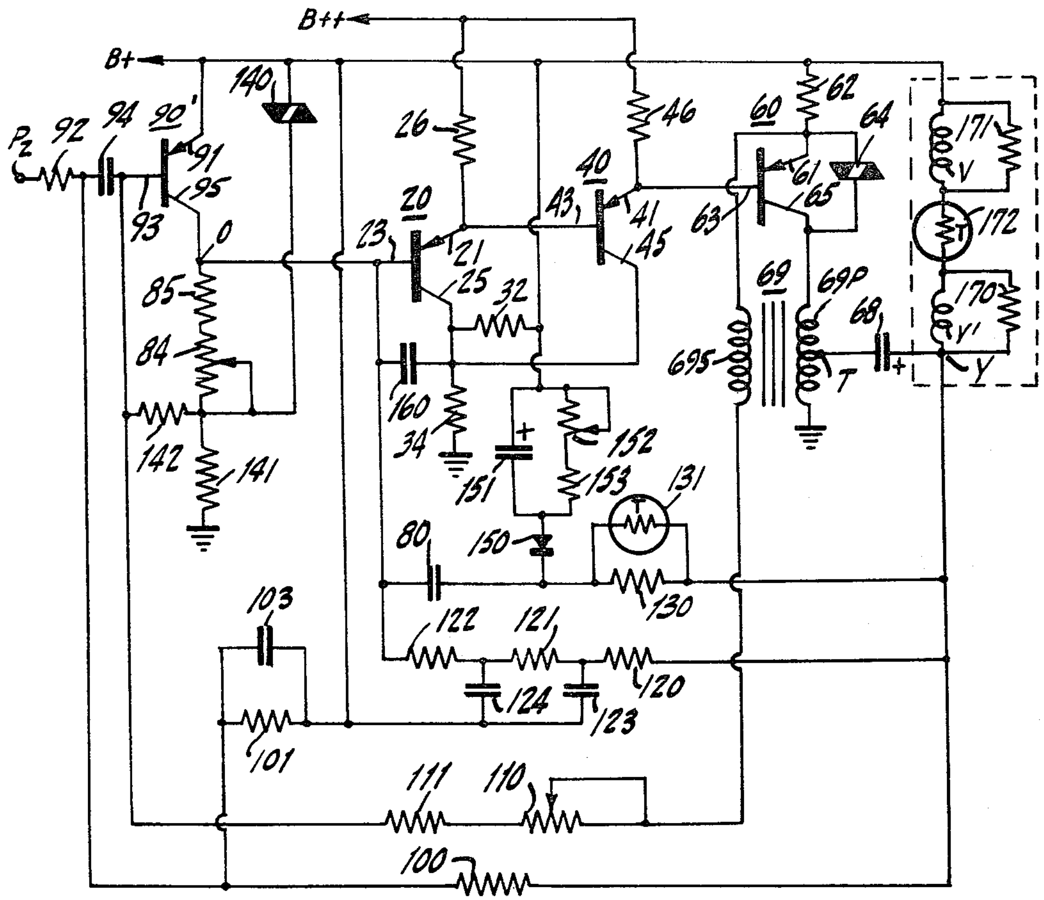
FIGURE 2 illustrates a modification of the embodiment of FIGURE 1.

In FIGURE 2, a modification of the vertical deflection arrangement of FIGURE 1 is illustrated. Where possible, the same reference numerals employed in FIGURE 1 are re-employed in FIGURE 2 to designate elements of corresponding character and function. The embodiment of FIGURE 2 incorporates a number of features of other copending applications, filed concurrently herewith, as will be indicated in detail subsequently.

It may be observed that the general configuration of the FIGURE 1 embodiment is continued in FIGURE 2, with the emitter follower stage 20 having its base connected to terminal O, its emitter output driving emitter follower stage 40, which in turn drives output transistor stage 60. The yoke windings V, V' are, as in FIGURE 1, connected in series with a DC blocking capacitor 68 between a B+ point and a point in the collector circuit of the output transistor 60. Yoke input terminal Y, at the junction of capacitor 68 and yoke winding V' is coupled back to the base electrode 23 of transistor 20 via negative feedback path including sawtooth capacitor 80. A resistive path between terminal O and chassis ground includes, inter alia, the variable resistor 84. The multivibrator action between transistor 90 and output transistor 60 is effected as in FIGURE 1, and synchronization in response to the synchronizing pulses appearing at terminal $P_2$ is retained.

To enhance the accuracy of the synchronization of the timing of the vertical deflection wave generation, an additional waveform is fed back to the transistor 90' base. The source of this waveform is the secondary winding 69S of a transformer 69, the primary winding (69P) of which is connected in the collector circuit of transistor 60, in place of the choke 66 of FIGURE 1. Capacitor 68, linking the collector 65 to the yoke input terminal Y, is connected to a tapping point T on primary winding 69P, instead of being connected directly to the collector 65, as was done in FIGURE 1. The tapping down procedure is for impedance matching purposes, which may be required for practical values of yoke and transistor parameters. Where the yoke and transistor parameters are such as not to require impedance matching assistance, the tap may be eliminated and connections made to winding 69P in the same manner as the choke 66 of FIGURE 1.

The waveform induced in secondary winding 69S is of a generally parabolic form presenting a sharply curving cusp in the vicinity of turn-on time for transistor 90'. This waveform is applied to base 93 via a path including a variable resistor 110 in series with a fixed resistor 111. Adjustment of the resistance value of resistor 110 provides control over the cusp curvature, and therefore provides a convenient vertical hold control, since it is instrumental in determining the timing of the turn-on of transistor 90. For a more detailed discussion of this hold control circuitry, reference may be made to the copending application of James A. McDonald, entitled "Transistor Deflection Control Arrangements" and filed concurrently herewith.

Also discussed in the above-named copending McDonald application is a further feedback arrangement, which is shown in FIGURE 2 as linking yoke input terminal Y to the base electrode 23 of the emitter follower stage 20, such additional feedback path including a trio of resistors 120, 121 and 122 connected in series, in the order named between terminal Y and base 23. A capacitor 123 is connected between the junction of series resistors 120 and 121 and the B+ potential source; an additional capacitor 124 is connected between the junction of series resistors 121 and 122 and the B+ potential source. The effect of this network is to provide a doubly integrated version of the vertical flyback pulse to the input of the feedback amplifier 20–40–60. The furnishing of such a waveform serves to effect so-called S-shaping of the current through the vertical yoke windings V, V'. Such shaping is appropriate, when relatively flat screen picture tubes are employed, since a perfectly linear sawtooth current will not provide a linear raster where the screen curvature does not bear a spherical surface relationship to the beam's deflection center. A more detailed discussion of these points will be found in the aforesaid McDonald application.

In the Miller feedback path of FIGURE 2, there is included, in series with capacitor 80, a resistive network comprising fixed resistor 130, shunted by a thermistor 131. This network provides an impedance for the capacitor discharging circuit which automatically adjusts in value with temperature changes to avoid adverse effects of temperature variations on deflection linearity. Further considerations of this feature will be found in another copending application of James A. McDonald, entitled "Temperature Compensation of Deflection Circuits" and also concurrently filed herewith. This latter McDonald application also provides an explanation for another feature of the FIGURE 2 circuitry, viz. the return of emitter resistors 26 and 46 to a unidirectional potential source (B++) of greater magnitude than the B+ potential source. Problems of thermal stability are solved by such connections, whereby assurance that transistor 60 will be cut off when transistor 90 is conducting is provided under most adverse temperature conditions.

A further feature of the FIGURE 2 circuitry involves the functioning of diode 150. Diode 150 has its cathode electrode directly connected to the junction of sawtooth capacitor 80 and discharge resistor 130; the anode electrode of diode 150 is coupled by means of an RC network to the B+ potential source. The RC network includes a large valued capacitor 151 shunted by the series combination of a variable resistor 152 and a fixed resistor 153. The diode 150 network serves a "jitter" clamp function, forestalling any tendency of the feedback amplifier 20–40–60 to oscillate at a subharmonic of the vertical deflection frequency. The nature of the clamp circuit operation renders variable resistor 152 suitable for serving as a linearity control for the deflection circuit. For further details on this clamp circuit and linearity control arrangement reference may be made to another copending application of James A. McDonald and Todd J. Christopher entitled "Deflection Control" and also concurrently filed herewith. Also discussed in said McDonald et al. application is the use of a capacitor 160 coupled between the collector 25 and the base 23 of transistor 20 for suppression of spurious high frequency oscillations. Still another feature of the said McDonald et al. application involves the utilization of a very low valued resistor 62 in the emitter return of transistor 60. In normal operation, the resistance value of resistor 62 is so very low (e.g., less than one ohm) as to have substantially no noticeable effect. However, should receiver turn-on conditions tend to result in the settling of transistor 60 into a highly conducting state approaching saturation, sufficient voltage will be developed across this resistor, and fed back to the base of transistor 90' (via feedback winding 69S in series with resistors 110 and 111) to initiate the desired multivibrator action.

It will be noted that the details of the yoke shown in FIGURE 2 reveals additional elements 170, 171 and 172 beyond those shown in th e FIGURE 1 embodiment. Resistors 170 and 171, individually shunting the respective vertical yoke winding halves V and V' serve well known damping functions. Thermistor 172, interposed between the winding halves in the yoke current path, serves to stabilize the yoke current amplitude in the face of temperature variations which may affect the effective resistance of the yoke windings, as disclosed in U.S. Patent No. 2,900,564, issued to William A. Barkow on Aug. 18, 1959.

A protection function is served by VDR 64, connected directly in shunt with the collector-emitter path of output transistor 60. The VDR 64 tends to limit the retrace pulse peak developed between collector 61 and emitter 65 when transistor 60 is rendered nonconducting; in its low resistance state under the peak voltage conditions, the VDR 64 bypasses the peak current to a substantial degree, precluding heavy current through the transistor at a time of high potential so as to avoid possible transistor damage.

The stabilizing circuitry of the present invention is disposed in the modified deflection circuit of FIGURE 2 in substantially the same manner as in FIGURE 1. Thus, again, VDR 140 and resistor 141 form a voltage divider between the B+ terminal and chassis ground, and height control resistor is returned to their junction, as is the base resistor 142 of transistor 90. An additional resistor 85 is connected in series with variable resistor 84 between the above-noted junction and terminal O in order to provide a limit on the control range of the manual height control. The regulating action of VDR 140 holds substantially constant the voltage across a charging circuit configuration comprising, in series, variable resistor 84, resistor 85, capacitor 80, resistive network 130–131, blocking condenser 68, a portion of winding 69P, conducting transistor 60, and the small-valued resistor 62. The undesired variations appearing at the B+ lead terminus of this series arrangement is matched to a substantial degree by the variations appearing at the opposite terminus (i.e., across resistor 141).

By way of example, a set of values for the circuit parameters of FIGURE 2, which values have proved satisfactory in operation, is presented in the previously mentioned copending Beck and Rhodes application, and reference may be made thereto for such illustrative information.

What is claimed is:

1. In a transistor deflection circuit, the combination of:
   an amplifier having an input terminal and an output terminal, said amplifier including a transistor having an emitter electrode connected to a source of unidirectional potential subject to undesired fluctuations in magnitude, and having a collector electrode coupled to said output terminal;
   means for establishing a negative feedback path between said output terminal and said input terminal of said amplifier, said feedback path including a capacitor;
   a variable resistor;
   means including said variable resistor for connecting said amplifier input terminal to a point of reference potential;
   a voltage dependent resistor;
   and means for shunting said voltage dependent resistor across a network comprising, in series, said variable resistor, said feedback path and the emitter-collector path of said transistor.

2. In a transistor deflection circuit, the combination of:
   a first transistor subject to periodic switching between a conductive and a nonconductive state, and having base, emitter and collector electrodes;
   means for connecting said emitter electrode of said first transistor to a source of unidirectional potential undesirably subject to variations in magnitude;
   an amplifier having an input terminal and an output terminal, said amplifier including a second transistor having an emitter electrode connected to said source of unidirectional potential, and having a collector electrode coupled to said output terminal;
   means for establishing a negative feedback path between said output terminal and said input terminal of said amplifier, said feedback path including a capacitor;
   means for connecting the collector electrode of said first transistor to said amplifier input terminal;
   a variable resistor;
   a fixed resistor;
   means including said variable resistor in series with said fixed resistor for connecting said amplifier input terminal to a point of reference potential;
   a voltage dependent resistor;
   means for shunting said voltage dependent resistor across a network comprising, in series, said variable resistor, said feedback path and the emitter-collector path of said second transistor;
   and resistive means for connecting said base electrode of said first transistor to the junction of said variable resistor and said fixed resistor.

3. In a transistor deflection circuit, the combination of:
   a first transistor subject to periodic switching between a conductive and a nonconductive state; and having base emitter and collector electrodes;
   an amplifier having an input terminal and an output terminal, said amplifier including a second transistor having an emitter electrode connected to a source of unidirectional potential subject to undesired fluctuations in magnitude, and having a collector electrode coupled to said output terminal;
   means for connecting the collector electrode of said first transistor to said amplified input terminal;
   means for connecting said emitter electrode of said first transistor to said unidirectional potential source;
   means for establishing a negative feedback path between said output terminal and said input terminal of said amplifier, said feedback path including a capacitor;
   a variable resistor;
   a pair of fixed resistors connected in series between the base electrode of said first transistor and a point of reference potential;
   means including said variable resistor for connecting said amplifier input terminal to the junction of said pair of fixed resistors;
   a voltage dependent resistor;
   and means for shunting said voltage dependent resistor across a network comprising, in series, said variable resistor, said feedback path and the emitter-collector path of said second transistor.

References Cited

UNITED STATES PATENTS

| | | | |
|---|---|---|---|
| 2,954,504 | 9/1960 | Saudinaitis et al. | 315—27 |
| 3,174,073 | 3/1965 | Massaman et al. | 315—27 |
| 3,178,593 | 4/1965 | Piehl | 315—27 |
| 3,200,289 | 8/1965 | Kramer et al. | 315—27 |
| 3,229,151 | 1/1966 | Attwood | 315—27 |
| 3,247,419 | 4/1966 | Attwood | 315—27 |

RODNEY D. BENNETT, *Primary Examiner.*

B. L. RIBANDO, *Assistant Examiner.*